(12) United States Patent
Kim

(10) Patent No.: US 7,239,792 B2
(45) Date of Patent: Jul. 3, 2007

(54) BACKLIGHT UNIT HAVING OPTICAL REFLECTOR

(75) Inventor: Jae Bum Kim, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/742,930

(22) Filed: Dec. 23, 2003

(65) Prior Publication Data

US 2004/0170373 A1    Sep. 2, 2004

(30) Foreign Application Priority Data

Feb. 18, 2003   (KR) .................. 10-2003-0010022

(51) Int. Cl.
G02B 6/04 (2006.01)
G02B 6/00 (2006.01)
G02F 1/1335 (2006.01)
F21V 7/04 (2006.01)

(52) U.S. Cl. ............... 385/901; 385/115; 385/147; 349/62; 362/561

(58) Field of Classification Search ............ 385/901; 349/61–65; 362/545, 561; 345/418
See application file for complete search history.

(56) References Cited

U.S. PATENT DOCUMENTS

| | | | | | |
|---|---|---|---|---|---|
| 5,053,765 | A | * | 10/1991 | Sonehara et al. | 340/815.43 |
| 5,252,733 | A | * | 10/1993 | Norman et al. | 540/465 |
| 5,408,563 | A | * | 4/1995 | Beland et al. | 385/125 |
| 5,806,955 | A | * | 9/1998 | Parkyn et al. | 362/612 |
| 6,361,180 | B1 | * | 3/2002 | Iimura | 362/31 |
| 6,655,825 | B2 | * | 12/2003 | Muthu et al. | 362/561 |
| 6,714,185 | B2 | * | 3/2004 | Kim et al. | 345/102 |
| 2004/0022050 | A1 | * | 2/2004 | Yamashita et al. | 362/31 |

* cited by examiner

Primary Examiner—Brian Healy
Assistant Examiner—Charlie Peng
(74) Attorney, Agent, or Firm—McKenna Long & Aldridge LLP (57) ABSTRACT

A backlight unit is disclosed, in which the light is concentrated when the light is incident on a light-guiding plate so as to improve light efficiency and color realization ratio. The backlight unit includes a light source emitting light; and optical fiber surrounding the circumference of the light source so as to concentrate and emit the light emitted from the light source.

7 Claims, 5 Drawing Sheets

BACKLIGHT UNIT HAVING OPTICAL REFLECTOR

This application claims the benefit of the Korean Application No. 10-2003-0010022 filed on Feb. 18, 2003, which is hereby incorporated by reference for all purposes as if fully set forth herein.

BACKGROUND OF THE INVENTION

1. Field of the Invention

The present invention relates to a liquid crystal display (LCD) device, and more particularly, to a backlight unit for improving light efficiency and color realization ratio.

2. Discussion of the Related Art

In general, cathode ray tubes (CRTs) are commonly employed as display devices for televisions, machines, and information terminals. However, CRTs fail to meet the current trend of miniature and lightweight electronic products due to their size and weight.

Accordingly, many efforts have been made to study and develop various types of display devices as substitutes for CRTs, such as liquid crystal display devices (LCDs), plasma display panels (PDPs), electro-luminescence displays (ELDs), and vacuum fluorescent displays (VFDs). For example, the LCD devices have been actively developed as flat display panels in laptop computers, desktop computers, and large-sized information displays because of their high quality image, lightness, thinness, compact size, and low power consumption. Thus, the demand for the LCD devices increases continuously.

At this time, the LCD device includes an LCD panel for displaying a picture image, and a driving part for applying a driving signal to the LCD panel. Further, the LCD panel includes first and second glass substrates bonded to each other at a predetermined distance, and a liquid crystal layer injected between the first and second glass substrates.

The first glass substrate (TFT-array substrate) includes a plurality of gate lines arranged in a first direction at fixed intervals, a plurality of data lines arranged in a second direction substantially perpendicular to the gate lines at fixed intervals, a plurality of pixel electrodes in respective pixel regions defined by the gate lines and the data lines in a matrix, and a plurality of thin film transistors (TFTs) switchable in response to signals on the gate lines for transmission of signals on the data line to the pixel electrodes.

The second glass substrate (color filter substrate) includes a black matrix layer for shielding portions of the first glass substrate excluding the pixel regions from extraneous light, a color filter layer (R/G/B) for displaying colors, and a common electrode for implementing a picture image. Then, a predetermined interval is maintained between the foregoing first and second glass substrates by spacers, and the first and second glass substrates are bonded by a sealant injected through a liquid crystal injection inlet.

Figure 1:
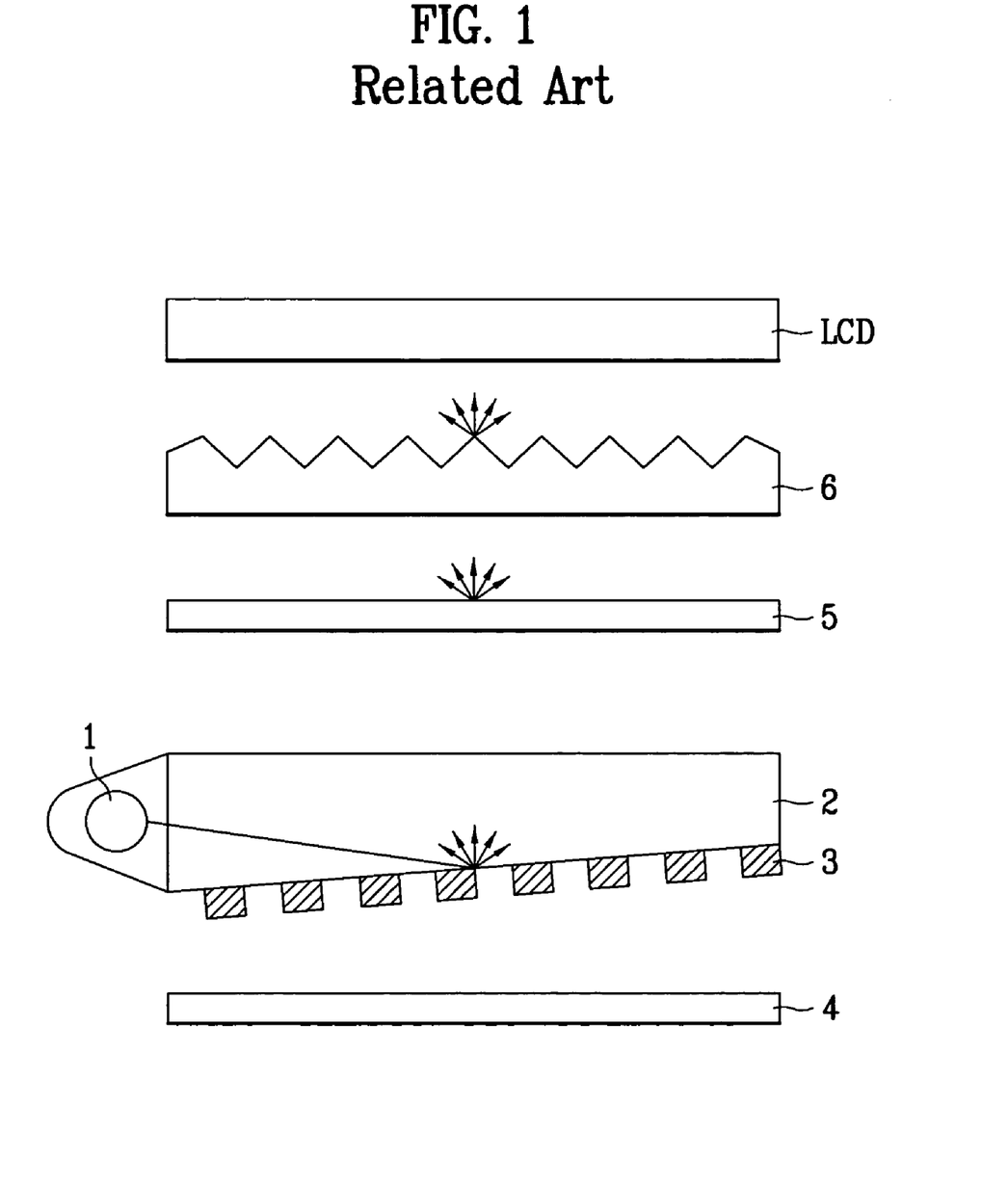
FIG. 1 illustrates a general backlight assembly.

FIG. 1 illustrates a related art backlight assembly. As shown in FIG. 1, the related art backlight assembly includes a fluorescent lamp 1, a light-guiding plate 2, a light-diffusion substance 3, a reflecting plate 4, a light-diffusion plate 5 and a prism sheet 6.

When a voltage is applied to the fluorescent lamp 1, electrons remaining in the fluorescent lamp 1 move to the anode, and the remaining electrons collide with argon Ar, whereby the argon Ar is excited. As a result, positive ions are generated, and the positive ions collide against the cathode, thereby generating secondary electrons. When the secondary electrons are discharged to the fluorescent lamp 1, the flow of the electrons collides with hydrargyrum vapor, and then ionized, thereby emitting ultraviolet rays and visible rays. Then, the emitted ultraviolet rays excite a fluorescent substance deposited inside the fluorescent lamp, thereby emitting the light.

The light-guiding plate 2 is a wave-guide that directs the light emitted from the fluorescent lamp 1 to be incident on the inside of the light guiding plate, and that emits light like a plate type light source. The light-guiding plate 2 may be formed of Polymethylmethacrylate (PMMA) having a great light transmittance. The light incidence of the light-guiding plate 2 is a function of the light-guiding plate thickness, the fluorescent lamp diameter, a distance between the light-guiding plate and the fluorescent lamp 1, and the shape of the reflecting plate. Generally, the fluorescent lamp 1 is slanted on the center of the light-guiding plate 2, thereby improving efficiency of the light incidence. The light-guiding plate 2 for the backlight unit of the LCD device may be divided into a printing-type light-guiding plate, a V-cut type light-guiding plate, or a scattering-type light-guiding plate.

Next, the light-diffusion substance 3 may be comprised of $SiO_2$ particles, PMMA and solvent. At this time, $SiO_2$ particles having porosity are used for diffusing the light. Also, PMMA is used for adhering $SiO_2$ particles to a lower surface of the light-guiding plate 2. The light-diffusion substance 3 is deposited on the lower surface of the light-guiding plate 2 in a pattern of intervals, and the size of each deposit is gradually increased to obtain a uniform plate-type light source on an upper surface of the light-guiding plate 2. That is, the deposits have a small size near to the fluorescent lamp 1, and a large size away from the fluorescent lamp 1. At this time, the shape of the deposits may be varied. In case of the deposits having the same size, the respective deposits have a luminance of the same level regardless of the deposit shape.

Subsequently, the reflecting plate 4 is formed behind the light-guiding plate 2, whereby the light emitted from the fluorescent lamp 1 is incident on the inside of the light-guiding plate 2 which is on the side of the light guiding plate facing the reflecting plate 4. Also, the light-diffusion plate 5 is formed on the upper surface of the light-guiding plate 2, on which the dotted patterns are deposited, to obtain a uniform luminance at each viewing angle. The light-diffusion plate 5 may be formed of PET or Poly Carbonate (PC) resin, and a particle-coating layer is formed on the light-diffusion plate 5 for diffusing the light.

Next, the prism sheet 6 is formed to improve the frontal luminance uniformity of the light transmitted and reflected through the upper side of the light-diffusion plate 5. The prism sheet 6 transmits light of a predetermined angle, and the light incident at other angles is totally reflected, whereby the light is then reflected towards the lower side of the prism sheet 6 by the reflecting plate 4.

The backlight assembly having the aforementioned structure may be fixed to a mold frame, and a display unit disposed at an upper side of the backlight assembly is protected by a top case. Also, the backlight assembly and the display unit may be received between the top case and the mold frame and may be coupled to each other.

Figure 2:
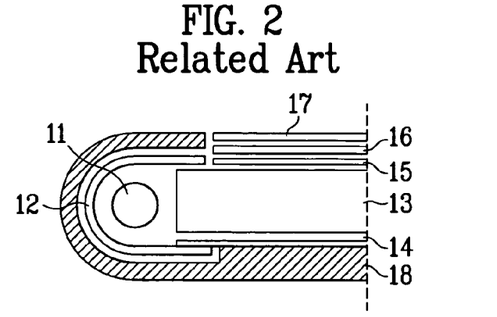
FIG. 2 illustrates a cross-sectional view of a backlight unit using a related art fluorescent lamp.

Hereinafter, a backlight unit of an LCD device according to the related art will be described with reference to the accompanying drawings. FIG. 2 illustrates a perspective view of a backlight unit using a related art fluorescent lamp.

As shown in FIG. 2, the backlight unit includes a fluorescent lamp 11, a lamp housing 12, a light-guiding plate 13, a reflecting plate 14, a light-diffusion plate 15, a prism sheet 16, a protection sheet 17, and a main supporter 18. A fluorescent substance is coated on the inside of the fluorescent lamp 11 for emitting light. Also, the lamp housing 12 fixes the fluorescent lamp 11, and concentrates the light emitted from the fluorescent lamp 11 in one direction. The light-guiding plate 13 directs the light emitted from the fluorescent lamp 11 to an upper side of an LCD panel, and the reflecting plate 14 adheres to a lower side of the light-guiding plate 13 and reflects any light directed away from the LCD panel back towards the light-guiding plate 13 and the LCD panel. The light-diffusion plate 15 is formed on an upper side of the light-guiding plate 13 to uniformly diffuse the light emitted from the light-guiding plate 13 towards the LCD panel. Also, the prism sheet 16 is formed on an upper side of the light-diffusion plate 15 to concentrate the light diffused in the light-diffusion plate 15, and to transmit the concentrated light to the LCD panel, and the protection sheet 17 is formed on an upper side of the prism sheet 16 to protect the prism sheet 16. The main supporter 18 receives and fixes the aforementioned elements.

In the aforementioned backlight unit, the light emitted from the fluorescent lamp 11 is concentrated on an incident surface of the light-guiding plate 13, and then the concentrated light passes through the light-guiding plate 13, the light-diffusion plate 15 and the prism sheet 16, whereby the light is transmitted to the LCD panel. However, the backlight unit using the related art fluorescent lamp has a low color realization ratio due to the light emitting characteristics of the light source. Also, it is hard to obtain a backlight unit having high luminance due to the constraints on size and capacity of the fluorescent lamp.

The backlight unit has been used for illuminating the screens of LCD devices, so that the viewer can watch information displayed on the screen in dark surroundings. Recently, many efforts have been made to obtain a very thin light-guiding plate to satisfy the demands of improved design and low power consumption. In addition, the LCD device has been developed to display various colors and to decrease the power consumption by using LEDs (light-emitting diode).

Figure 3:
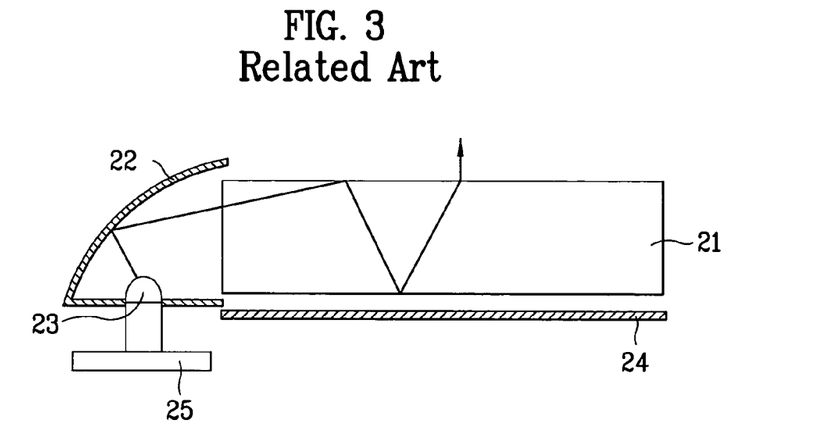
FIG. 3 illustrates a cross-sectional view of a backlight unit using a related art LED.

FIG. 3 illustrates a cross-sectional view of a backlight unit using a related art LED (light-emitting diode). As shown in FIG. 3, the backlight unit includes a light-guiding plate 21, an LED lamp 23, a lamp housing 22 and a reflecting plate 24. At this time, the light-guiding plate 21 is formed at the rear of an LCD panel (not shown), and the LED lamp 23 is formed at one side of the light-guiding plate 21 so as to emit the light. Also, the lamp housing 22 surrounding the LED lamp 23 reflects the light emitted from the LED lamp 23, and the reflecting plate 24 is provided below the light-guiding plate 21 so as to reflect the light leaking in a direction away from the LCD panel to the light-guiding plate 21.

The lamp housing 22 is formed of a reflective material such as aluminum (Al). Although not shown, the light emitted from the LED lamp 23 is reflected in the lamp housing 22, and then the reflected light is incident on the light-guiding plate 21. In this case, red, green, and blue LED lamps 23 are arranged in one-dimensional structures, and the LED lamps 23 are arranged on a PCB substrate 25 in the order of red, green and blue.

In case of displaying a picture image on the LCD panel using the aforementioned backlight unit, the LED lamps 23 are turned on. When a voltage is applied to the red, green and blue LED lamps 23, the three-colored LED lamps emit light. The light emitted from the red, green and blue LED lamps is scattered in the light-guiding plate 21, thereby generating a color mixture. As a result, the rear of the LCD panel is illuminated with a white light.

Figure 4:
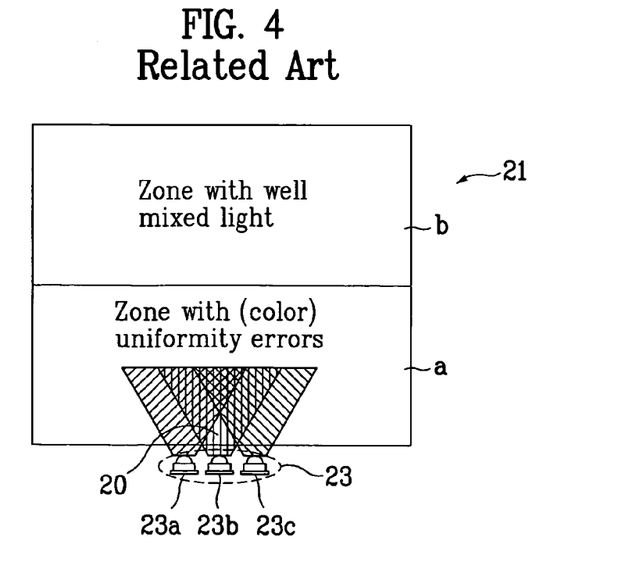
FIG. 4 illustrates a plan view of a backlight unit using a related art LED.

FIG. 4 illustrates a plan view of the backlight unit using the related art LED. As shown in FIG. 4, the backlight unit includes the LED lamps 23 and the light-guiding plate 21. The LED lamps 23 include red (R), green (G) and blue (B) LED lamps 23a, 23b and 23c, respectively, and the light-guiding plate 21 is formed at the rear of the LCD panel to uniformly diffuse the light emitted from the LED lamps 23 to the LCD panel.

In order to emit the white light using the LED lamps 23 as a light source, R, G and B monochromatic light is emitted from the respective LED lamps 23. In the area 'a' of the light-guiding plate 21, there is a predetermined portion 20 where the light emitted from the respective LED lamps 23 is not overlapped, so that it is impossible to emit the uniform white light. In the area 'b' of the light-guiding plate 21, R, G and B monochromatic light emitted from the respective LED lamps 23 is mixed, thereby generating uniform white light.

Accordingly, a luminous point is formed on the light-guiding plate 21 that effectively defines the 'b' area of the light-guiding plate 21 in the backlight unit where the light is effectively mixed, and thereby using the half of the light-guiding plate 21 set apart from the LED light source 23. By using LEDs as the light source for illuminating the LCD panel, it is possible to obtain miniaturization and low power consumption in electrical devices such as notebook PCs. A DC voltage of 1.5V is applied to the LED to produce light. Thus, DC-AC converter is not required, thereby greatly reducing power consumption. Also, the LED has greater reliability than that of a cathode ray tube because the LED is a semiconductor device. Furthermore, the LED can be miniaturized and have a long life.

In the backlight unit of the LCD device according to the related art, the light emitted from the red (R), green (G) and blue (B) LED lamps is mixed, thereby illuminating the LCD panel with the white light.

However, the backlight unit of the LCD device according to the related art has the following disadvantages.

It is difficult to mix the red, green and blue light emitted from the respective red (R), green (G) and blue (B) LED lamps, and to emit the white light by uniformly mixing the three colors, thereby reducing lighting efficiency and the color realization ratio.

SUMMARY OF THE INVENTION

Accordingly, the present invention is directed to a backlight unit that substantially obviates one or more problems due to limitations and disadvantages of the related art.

An advantage of the present invention is to provide a backlight unit, in which the light is concentrated when the light is incident on a light-guiding plate so as to improve the light efficiency and color realization ratio.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a light source emitting light; and optical fiber surrounding the circumference of the light source so as to concentrate and emit the light emitted from the light source.

The light source is formed of any one of a plurality of red, green and blue LEDs, a plurality of white LEDs, and fluorescent lamps.

In another aspect, a backlight unit includes a light-guiding plate at the rear of an LCD panel; a light source at one side of the light-guiding plate so as to emit the light; optical fiber surrounding the circumference of the light source so as to concentrate the light emitted from the light source, and emit the concentrated light to an incident surface of the light-guiding plate; and a reflecting plate below the light-guiding plate so as to reflect the light leaking at an opposite side of the LCD panel to the light-guiding plate.

The light source may be formed at both sides of the light-guiding plate, or at the rear of the light-guiding plate.

In another aspect, a backlight unit includes a main light-guiding plate at the rear of an LCD panel; a sub light-guiding plate in an incident part at one side of the main light-guiding plate; a light source at one side of the sub light-guiding plate so as to emit the light; first optical fiber surrounding the circumference of the light source, so as to concentrate and emit the light emitted from the light source to the incident surface of the sub light-guiding plate; first and second reflecting plates below the main light-guiding plate, so as to reflect the light leaking at an opposite side of the LCD panel to the main and sub light-guiding plates; and second optical fiber surrounding the emitting surface of the sub light-guiding plate and the incident surface of the main light-guiding plate, so as to concentrate and emit the light emitted through the sub light-guiding plate to the incident surface of the main light-guiding plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A backlight unit according to the present invention will be described with reference to the accompanying drawings.

In the backlight unit according to the present invention, a lamp housing is formed of optical fiber, and the light emitted from LED lamps is concentrated and incident on a light-guiding plate, thereby maximizing light efficiency. The optical fiber is classified as glass fiber and plastic fiber according to the quality. For example, the glass optical fiber includes silicic optical fiber, fluoride optical fiber and rare-earth optical fiber.

The silicic optical fiber is made up of silica. In this case, a dopant such as F, $B_2O_3$ or $GeO_2$, or an oxide such as $P_2O_5$ is added to the silica so as to obtain different refractive indexes in the core and cladding. In addition, if $GeO_2$ or $P_2O_5$ is added to the silica, the refractive index increases. If fluorine or $B_2O_3$ is added to the silica, the refractive index decreases. The refractive index of the cladding is smaller than that of the core, and the cladding has various component ratios. The silicic optical fiber is not easily deformed at a high temperature of 1000° C. or more. Also, the silicic optical fiber has a low coefficient of thermal expansion, so that the silicic optical fiber is not broken by a sudden thermal change.

A fluoride glass, which has a wavelength range between 0.2 μm and 8 μm, has the least loss of transmittance at the wavelength range of 2.55 μm.

The fluoride optical fiber includes a $ZrF_4$ component in a large amount, and other components are added to the fluoride optical fiber so as to make glass. At this time, if the core of the fluoride optical fiber and some of $ZrF_4$ are replaced by $HaF_4$ so as to lower the refractive index, thereby obtaining ZBLAN optical fiber with ZHBLAN cladding. In this case, the optical fiber is advantageous in that it is possible to decrease the loss of transmittance from 0.01 dB/km to 0.001 dB/km. However, the optical fiber has a problem in that it is impossible to obtain an optical fiber having a long length.

The rare-earth optical fiber is an active type optical fiber having new optical and magnetic characteristics, which is made by adding rare-earth components to the related art passive optical fiber for transmitting the light. The rare-earth metals such as Nd, Er, Dy, Th, Ce, Eu, Tm, Yb and Pr are generally used, and the rare-earth optical fiber made by adding Er to the core of the silicic optical fiber is used most often. The rare-earth optical fiber may be used for an amplifier, an isolator, or an optical fiber laser.

However, the optical fiber is apt to be broken, and it is difficult to manufacture the optical fiber having a predetermined size due to complicated process steps. In this respect, the plastic optical fiber substitutes for the related art glass optical fiber. Generally, POF uses a core of acrylic polymer, and the cladding of fluoride polymer.

The plastic optical fiber uses a light source in the visible range of 650 nm, so that the use of plastic optical fiber is not dangerous to eyes, and it is suitable for short-distance communication within several kilometers. Also, it has great flexibility and tolerance to vibration and bending, whereby the plastic optical fiber may be used in a small space, a rapid transit train, or an automobile. Also, the plastic optical fiber may be used for a display illuminator or a device for manufacturing a semiconductor because the plastic optical fiber does not generate the heat. Further, the plastic optical fiber is not influenced by electronic fields, and the plastic optical fiber is an insulating material, whereby the plastic optical fiber may be used for a special illuminator.

Figure 5:
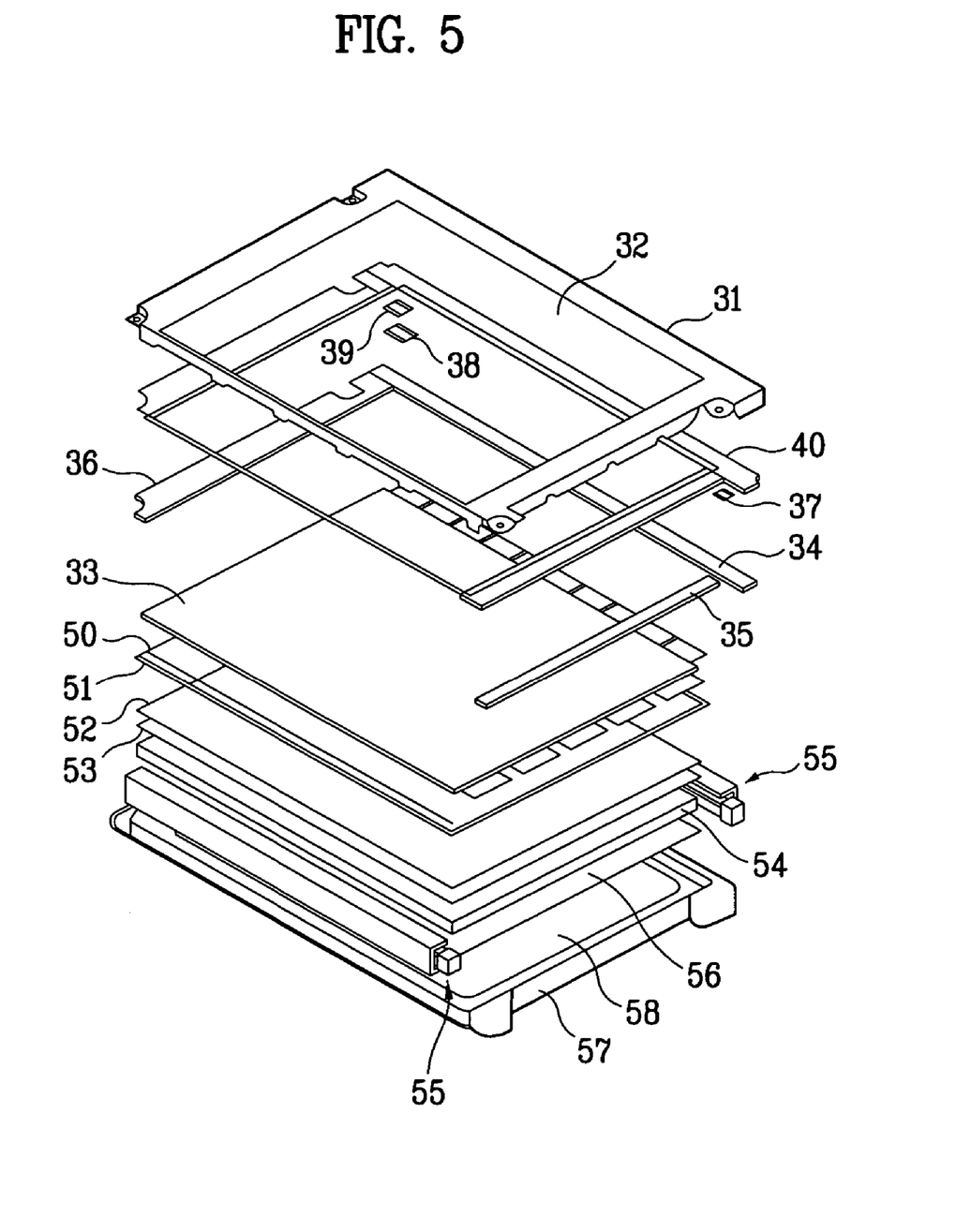
FIG. 5 illustrates a perspective view of an LCD device according to the present invention.

FIG. 5 illustrates a perspective view of an LCD device according to the present invention. As shown in FIG. 5, the LCD according to the present invention includes a metal shield case 31 as an upper frame, and a display window 32 for defining an effective screen of an LCM (liquid crystal display module). At this time, an LCD panel 33 is located below the shield case 31 and the display window 32. Also, the LCD panel 33 includes a TFT having source/drain electrodes, a gate electrode and an amorphous silicon layer or a color filter between the two glass substrates.

Then, a drain circuit substrate 34, a gate circuit substrate 35 and an interface circuit substrate 36 are formed on the LCD panel 33. In addition, joiners 37, 38 and 39 are provided so as to connect the circuit substrates to one another. The circuit substrates 34, 35 and 36 are fixed to the shield case 31 through an insulating sheet 40.

Meanwhile, a light-shielding matrix 51 is provided with a rubber cushion 50 below the LCD panel 33, and a light-diffusion plate 52 and a prism sheet 53 are provided below the light-shielding matrix 51. At this time, the light is guided to the light-diffusion plate 52 by the light-guiding plate, and then the light is diffused in the light-diffusion plate 52 uniformly. The prism sheet 53 is used for improving the luminance in a frontal direction.

Next, the light-guiding plate 54 is provided below the prism sheet 53, and fluorescent tube units 55 are provided at two sides of the light-guiding plate 54. Also, a reflecting plate 56 is provided below the light-guiding plate 54 so as to reflect the light incident on the light-guiding plate 54 from the fluorescent lamps 55 towards the LCD panel 33. Then, a lower case 57 having an opening 58 is provided below the reflecting plate 56. Although not shown, the fluorescent tube unit 55 is provided with a fluorescent lamp and a lamp housing for concentrating the light emitted from the fluorescent lamp.

Figure 6:
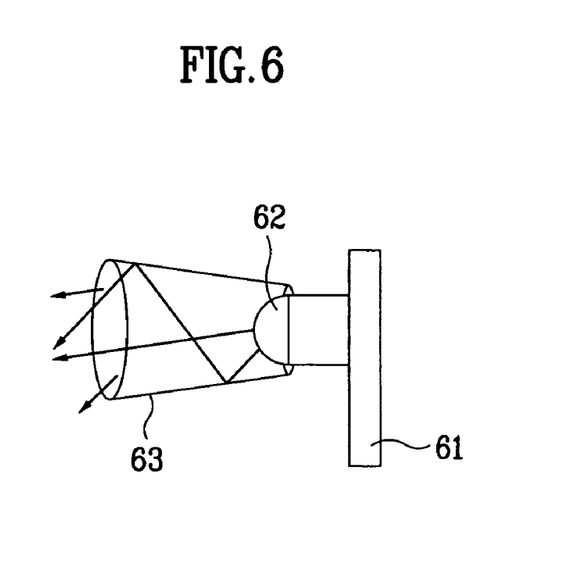
FIG. 6 illustrates a cross-sectional view of a backlight unit according to the present invention.

FIG. 6 illustrates a cross-sectional view of a backlight unit according to the present invention. As shown in FIG. 6, the backlight unit includes a light source 62 formed on a PCB substrate 61 so as to emit light, and an optical fiber 63 surrounding the circumference of the light source 62 so as to concentrate the light from the light source 62. In the case of a related art backlight unit, a reflecting plate is formed of aluminum Al in a lamp housing. Meanwhile, the backlight unit according to the present invention uses the optical fiber 63 for concentrating the light. At this time, the light source 62 is formed of any one of red, green or blue LEDs, white LEDs, or fluorescent lamps.

Figure 7:
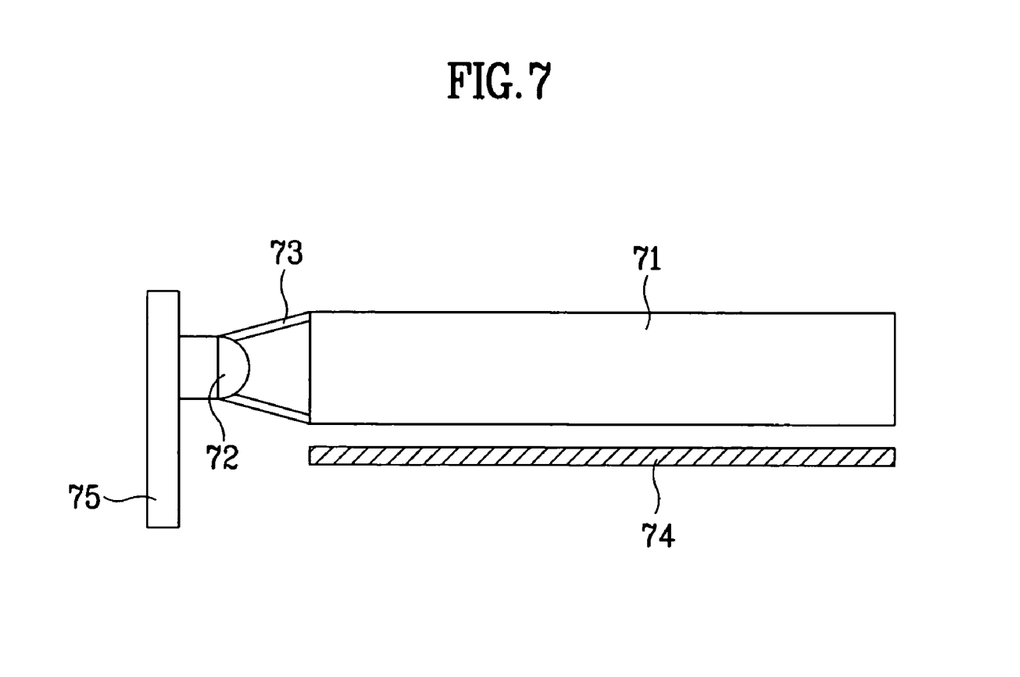
FIG. 7 illustrates a lateral view of a backlight unit according to the first embodiment of the present invention.

FIG. 7 illustrates a lateral view of a backlight unit according to the first embodiment of the present invention. As shown in FIG. 7, a light-guiding plate 71 is located at the rear of an LCD panel (33 of FIG. 5), and a light source 72 is located at one side of the light-guiding plate 71 so as to emit the light. Also, optical fiber 73 surrounds the circumference of the light source 72 so as to concentrate the light emitted from the light source 72, and the concentrated light is emitted to an incident surface of the light-guiding plate 71. The light source 72 may include white LEDs, red LEDs, green LEDs, and blue LEDs on a PCB substrate 75. The white, red, green and blue LEDs are arranged in one-dimensional structure, in which each LED has a body and an emitting part. Meanwhile, the optical fiber 73 surrounds the emitting parts of the respective LEDs arranged on the PCB substrate 75. A reflecting plate 74 is located below the light-guiding plate 71 so as to reflect the light leaking in a direction away from the LCD panel to the light-guiding plate 71.

In a display mode of an LCD device using the aforementioned backlight unit, the respective white, red, green and blue LEDs of the light source 72 to emit the light. Then, the white, red, green and blue light emitted from the respective LEDs is incident on the light-guiding plate 71 using the optical fiber 73, and then the incident light is mixed by scattering the light in the light-guiding plate 71, whereby the LCD panel is illuminated with white light emitted from the entire surface of the light-guiding plate 71. Then, the white light incident on the LCD panel is modulated according to alignment of the liquid crystal, and the light is transmitted through the color filter of an upper substrate, thereby outputting a color image.

In the backlight unit according to the first embodiment of the present invention, the light source 72 is located at one side of the light-guiding plate 71. However, it is possible to provide the light sources 72 at both sides of the light-guiding plate 71, or to provide a plurality of light sources 72 around the light-guiding plate 71.

Figure 8:
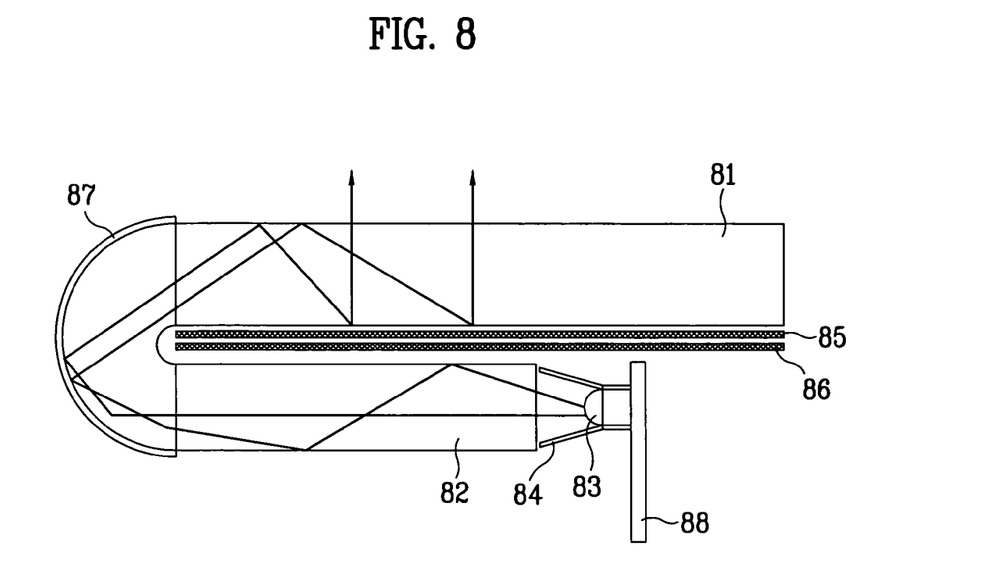
FIG. 8 illustrates a lateral view of a backlight unit according to the second embodiment of the present invention.
Figure 9:
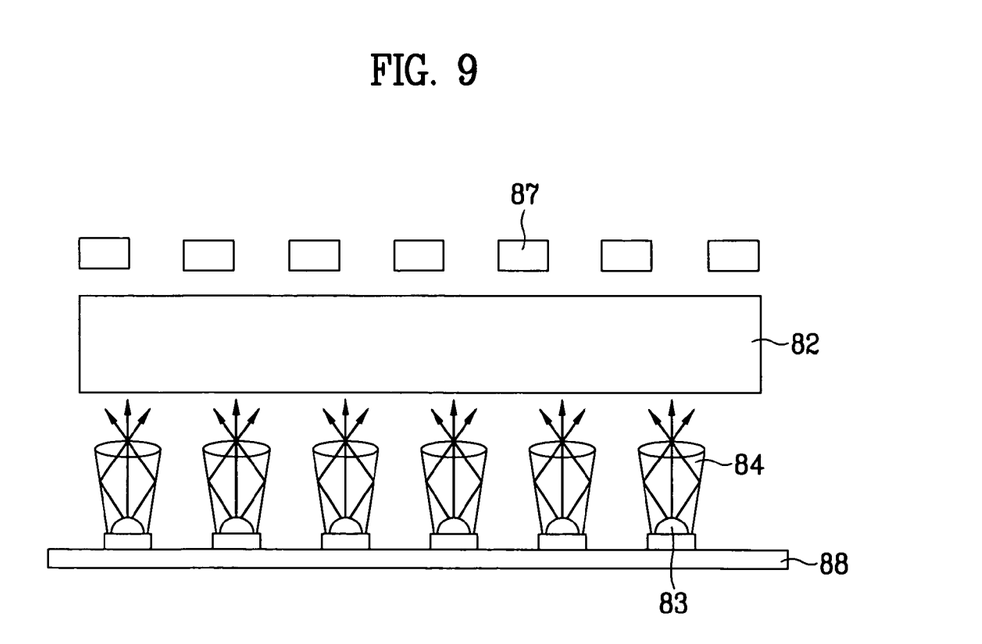
FIG. 9 illustrates a top view of a backlight unit according to the second embodiment of the present invention.

FIG. 8 illustrates a lateral view of a backlight unit according to a second embodiment of the present invention, and FIG. 9 illustrates a top view of a backlight unit according to the second embodiment of the present invention.

As shown in FIG. 8 and FIG. 9, the backlight unit according to the second embodiment of the present invention includes a main light-guiding plate 81, a sub light-guiding plate 82, a light source 83, first optical fiber 84, first and second reflecting plates 85 and 86, and second optical fiber 87. At this time, the main light-guiding plate 81 is located at the rear of an LCD panel (33 of FIG. 5), and the sub light-guiding plate 82 is located at an incident part at one side of the main light-guiding plate 81. Also, the light source 83 is located at one side of the sub light-guiding plate 82, in which a plurality of LEDs are arranged in the order of red R, green G and blue B LEDs. The first optical fiber 84 surround the circumference of the light source 83 so as to concentrate and emit the light from the light source 83, and the first and second reflecting plates 85 and 86 are formed below the main light-guiding plate 81 in order to reflect the light leaking from the main light-guiding plate 81 and the sub light-guiding plate 82 back into those panels. The second optical fiber 87 surrounds the emitting surface of the sub light-guiding plate 82 and the incident surface of the main light-guiding plate 81, so as to concentrate the light emitted through the sub light-guiding plate 82, and to emit the concentrated light to incident surface of the main light-guiding plate 81.

Referring to FIGS. 8–9, the light source 83 includes the red R, green G and blue B LEDs arranged on a PCB substrate 88 in a one-dimensional structure. Also, the sub light-guiding plate 82 may be formed at the other side of the main light-guiding plate 81. Further, the first optical fiber 84 concentrates the light emitted from the light source 83 which is then incident on the sub light-guiding plate 82. The second optical fiber 87 concentrates the white light mixed in the sub light-guiding plate 82, and guides it to be incident to the main light-guiding plate 81.

According to the second embodiment of the present invention, as the sub light-guiding plate 82 in the backlight unit mixes the respective colors from the light sources 83, white-colored light is emitted. In this respect, it is possible to improve the color mixture of the white light emitted from the main light-guiding plate 81. In comparison with the backlight according to the first embodiment of the present invention, the backlight according to the second embodiment of the present invention obtains greater color separation and luminance.

As mentioned above, the backlight unit according to the present invention has the following advantages.

First, the optical fiber is provided in the circumference of the light source, so that the light emitted from the light source is concentrated and emitted to the incident surface of the light-guiding plate, thereby improving the light efficiency and color realization ratio.

Also, it is possible to decrease the number of the LEDs and power consumption because the light emitted from the light source is concentrated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit comprising:
    a light-guiding plate at the rear of an LCD panel;
    first and second light source units at both sides of the light-guiding plate to emit light, each first and second light source unit having at least one luminous element;
    a plurality of optical fibers each optical fiber corresponding to the at least one luminous element and surrounding a circumference of the corresponding luminous element of the first and second light source units, to concentrate and to emit the light emitted from the first and second light units; and
    a reflecting plate below the light-guiding plate, so as to reflect the light leaking in a direction away from the LCD panel to the light-guiding plate.

2. The backlight unit of claim 1, wherein each optical fiber is one of a glass optical fiber and a plastic optical fiber.

3. The backlight unit of claim 2, wherein the glass optical fiber is any of a silicic optical fiber, a fluoride optical fiber, and a rare-earth optical fiber.

4. The backlight unit of claim 1, wherein the luminous elements include one of a plurality of red, green and blue LEDs, a plurality of white LEDs, and fluorescent lamps.

5. A backlight unit comprising:
    a main light-guiding plate at the rear of an LCD panel;
    a sub light-guiding plate at one side of the main light-guiding plate;
    a light source at one side of the sub light-guiding plate to emit light;
    first optical fibers surrounding the circumference of the light source, so as to concentrate and to emit the light emitted from the light source to an incident surface of the sub light-guiding plate;
    first and second reflecting plates below the main light-guiding plate, reflecting the light leaking from the main and sub light-guiding plates; and
    a second optical fiber surrounding an emitting surface of the sub light-guiding plate and an incident surface of the main light-guiding plate, so as to concentrate and emit the light emitted from the sub light-guiding plate to the incident surface of the main light-guiding plate.

6. The backlight unit of claim 5, wherein the first and second optical fibers are one of a glass optical fiber and a plastic optical fiber.

7. The backlight unit of claim 6, wherein the glass optical fiber is any one of a silicic optical fiber, a fluoride optical fiber, and a rare-earth optical fiber.

* * * * *